United States Patent
Goodman

(10) Patent No.: US 6,922,709 B2
(45) Date of Patent: Jul. 26, 2005

(54) METHOD FOR MAINTAINING CONSISTENT DUAL COPIES OF VITAL PRODUCT DATA IN A DUAL ACCESSOR LIBRARY OF PORTABLE DATA STORAGE MEDIA

(75) Inventor: Brian Gerard Goodman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 10/079,637

(22) Filed: Feb. 19, 2002

(65) Prior Publication Data

US 2003/0158870 A1 Aug. 21, 2003

(51) Int. Cl.[7] ............................................. G06F 12/06
(52) U.S. Cl. ...................................... 707/203; 707/201
(58) Field of Search ............................... 707/203, 201; 706/45; 369/36.01

(56) References Cited

U.S. PATENT DOCUMENTS

| | | | | |
|---|---|---|---|---|
| 5,903,897 A | * | 5/1999 | Carrier et al. | 707/203 |
| 5,970,030 A | * | 10/1999 | Dimitri et al. | 369/30.46 |
| 6,560,614 B1 | * | 5/2003 | Barboy et al. | 707/201 |
| 6,711,557 B1 | * | 3/2004 | Palaniappan | 706/45 |

FOREIGN PATENT DOCUMENTS

| | | | | |
|---|---|---|---|---|
| EP | 0859308 A1 | 8/1998 | | G06F/3/06 |
| EP | 0989550 A1 | 3/2000 | | G11B/15/68 |
| JP | 4023118 A | 1/1992 | | G06F/3/06 |
| JP | 4145518 A | 5/1992 | | G06F/3/06 |
| JP | 4174019 A | 6/1992 | | G06F/3/06 |
| JP | 6035615 A | 2/1994 | | G06F/3/06 |
| WO | WO 9833113 A1 | 7/1998 | | G06F/3/06 |

OTHER PUBLICATIONS

"Short Library Accessor Standby", M.S. Carnes and R.M. Correy, *IBM Technical Disclosure Bulletin*, vol. 19, No. 8, Jan. 1977, p. 2922.

"Updating Software and Configuration Data in a Distributed Communications Network", Carl W. Symborski, *IEEE*, 1988, pp. 331–338.

* cited by examiner

*Primary Examiner*—Greta Robinson
*Assistant Examiner*—Sathyanarayan Pannala
(74) *Attorney, Agent, or Firm*—Dan Hubert; John Kennel

(57) ABSTRACT

A dual accessor library is equipped to maintain consistent dual copies of vital product data (VPD) or other such metadata. For each accessor, the library includes various associated components, including a controller to manage the media accessor, VPD or other such metadata containing information representing prescribed types of library properties, and a version code corresponding to the VPD. Each controller advances the associated version code in response to VPD changes. Responsive to predetermined stimuli, the accessor controllers compare their associated version codes and if the version codes do not match, updating the older VPD with contents of the newer VPD.

18 Claims, 3 Drawing Sheets

METHOD FOR MAINTAINING CONSISTENT DUAL COPIES OF VITAL PRODUCT DATA IN A DUAL ACCESSOR LIBRARY OF PORTABLE DATA STORAGE MEDIA

BACKGROUND OF THE INVENTION

1. Field of the Invention

The present invention relates to automated data storage libraries. More particularly, one embodiment of the invention concerns a method for maintaining consistent dual copies of vital product data in a dual accessor library.

2. Description of the Related Art

In this information age, the sheer volume of information is incredible. Many customers with substantial data storage needs are turning to automated data storage libraries. Automated data storage libraries utilize many portable data storage media, such as magnetic tape and optical cartridges. Accessors transport the media between various sites such as media access drives, storage slots, import/export slots, and the like. Often, the accessors comprise grippers that move along vertical and horizontal rails according to various (x,y) type coordinates. Accessors may also comprise robotic arms and other such devices. Older libraries utilize a single accessor, whereas some new libraries are using dual accessors to more quickly carry out media transport requests. Typically, each accessor is managed by an accessor controller or other similar processing entity.

An accessor controller, then, directs the movement of its accessor in order to physically transport media items among various sites in the library. In addition, an accessor controller maintains various metadata concerning the accessor and library. One example of this metadata is "vital product data" (VPD), which primarily includes calibration data and configuration data. "Calibration data" is a set of tuning values that allow the system to perform mechanical motions with a high degree of accuracy and repeatability. For instance, calibration data correlates mechanical grippers to certain physical locations in the library. This data is usually obtained through a self-calibration step that may be performed at the factory and/or at the customer site. In contrast to calibration data, "configuration data" describes the overall configuration of the library system and/or library components. Some examples include the number and type of robotic devices, any additional attachments or options, optional characteristics of the system, part numbers or model numbers of the library and/or library components, engineering change (EC) levels, the number of frames in the library, number and location of storage slots in each frame, number and location of import/export stations, number and location of read/write drives, etc.

With dual accessors, there are usually two copies of VPD. Namely, each accessor controller maintains a copy of the VPD in conjunction with its accessor. One common approach is to maintain two independent copies of VPD where each accessor must be configured and calibrated independently of the other accessor. There is little or no sharing of VPD between the two accessors. Additional complexity, memory, and cost is required if these two independent copies are to be backed up. Another approach is to maintain two copies of a single VPD which contains common elements between the two accessors and may also contain unique data for each particular accessor. Library configuration data is one example of common shared data, while accessor calibration data is one example of data that may (depending upon the implementation) be unique to each accessor. This approach offers the advantage of simplifying the management of the VPD because the same data is shared between the accessors and it also provides a backup of the VPD since each accessor will have a copy of the same VPD.

One danger in maintaining two VPD copies is that the copies can eventually diverge, such that the VPD copies are inconsistent with each other. For example, one accessor may be out of service while a change in library configuration causes the other accessor to modify its VPD. One known solution is for each accessor controller to timestamp its VPD when any change is made. This eases the job of distinguishing between the current and outdated copies of VPD. From the standpoint of cost, one disadvantage of this approach is that it requires the added cost of a clock and battery or backup power source for each accessor controller. Another disadvantage of this approach is that it is vulnerable to error if the clock fails, the battery fails, the clock is improperly set or reset, the clocks are not synchronized, etc.

Another solution for maintaining VPD consistency utilizes a third party to arbitrate between the accessor controllers. For example, when the VPD changes on one accessor, while the other accessor is unavailable, the arbitrator is notified. When the other accessor becomes available, the arbitrator will cause that accessor to be updated. This may be done by telling one or both accessors that the two copies of VPD are out of sync or the VPD synchronization may be initiated directly by the arbitrator. Two disadvantages with this approach is the added hardware cost and software complexity to provide and operate an arbitrator.

Consequently, known approaches to managing VPD in dual accessor automated data storage libraries are not completely adequate for some applications due to certain unsolved problems.

SUMMARY OF THE INVENTION

Broadly, the present invention concerns a method for maintaining consistent dual copies of VPD or other designated metadata in an automated data storage library that includes dual accessors for transporting portable data storage media. For each accessor, the library includes various associated components, including a controller to manage the accessor, VPD or other such metadata containing information representing prescribed types of library properties, and a version code corresponding to the VPD. Each controller advances its version code in response to changes to the associated VPD. Responsive to predetermined stimuli, the accessor controllers compare their associated version codes, and if the version codes do not match, update the older VPD with contents of the newer VPD.

This system affords its users with a number of distinct advantages. For instance, techniques disclosed herein prevent dual copies of VPD from diverging and possibly introducing confusion, error, or failure in the library. Advantageously, consistent copies of metadata are preserved without requiring the additional expense and operational overhead of a system clock, third party arbitrator, etc. Additionally, a backup copy of the metadata is provided since each accessor contains a copy of the same information. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections
Automated Data Storage Library

Figure 1:
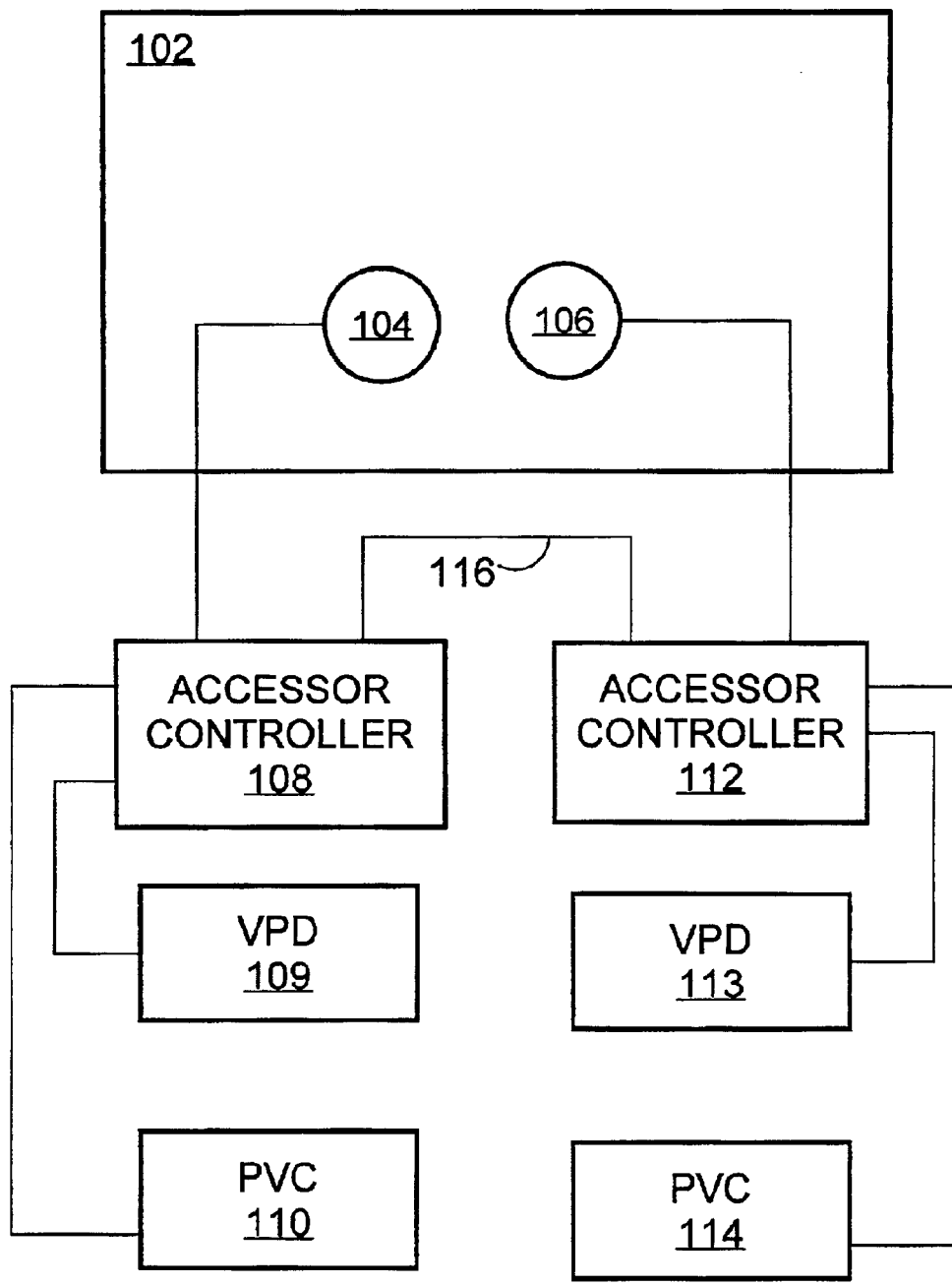
FIG. 1 is a block diagram of the hardware components and interconnections of an automated data storage library.

One aspect of the present invention concerns an automated data storage library, which may be embodied by various hardware components and interconnections, with one example being described by the automated data storage library 100 of FIG. 1. The library 100 is designed to house, transport, read data from, and write data to portable data storage media such as magnetic tape cartridges, optical cartridges, etc. The library 100 includes library infrastructure 102, such as media access drives (read drives, read/write drives, etc.), storage slots, import/export slots, and dual accessors 104, 106. The accessors 104, 106 comprise electromechanical devices to grip, release, identify, and transport items of portable data storage media. The accessors 104,106 may also perform calibration and other known tasks not directly related to media movement of media items.

The dual accessors 104, 106 move in accordance with analog signals, digital signals, and/or complex commands transmitted by corresponding accessor controllers 108, 112. The controllers 108, 112 comprise separate processing entities, and each may comprise a different device (such as a computer, processor, circuit, chip, etc.), or different processing thread (such as an application program, subroutine, code sequence, programming object, etc.) running on a shared machine. Redundancy is a particular advantage of utilizing separate machines for the controllers 108, 112, since one controller 108 may fail without affecting the operation of the other controller and hence the accessibility of library contents. The controllers 108, 112 are coupled by a link 116, the nature of which depends upon the implementation of the controllers 108, 112. For instance, the link 116 may comprise a hardware construct such as wire, cable, bus, wireless link, intelligent channel, port, etc. Alternatively, the link 116 may comprise a software construct such as a programming object, buffer or other register for passing data, software interface, etc.

Each controller 108, 112 is associated with its own VPD and pseudo version code (PVC). The controller 108, for instance, is associated with the VPD 109 and PVC 110, whereas the controller 112 is associated with the VPD 113 and PVC 114. The VPD 109, 113 and PVC 110, 114 may comprise hardware and/or software components as appropriate to the implementation of the controllers 108, 112. To aid in system robustness, the VPD and PVC may be stored in one or more nonvolatile storage components. Some other examples include circuit and/or electromechanical storage devices, electrical or optical or magnetic storage media, software constructs, address ranges in the same or different storage media, or any other conceivable implementation. In the illustrated embodiment, each VPD contains various information about the library, such as the library part number or model number, engineering change (EC) levels, calibration data correlating the gripper to certain physical locations in the library, and library configuration data. Although the example of "vital" product data is utilized herein, the concepts of this disclosure may be applied without limitation to other types of product, system, component, or other data, which may be generally referred to as "metadata."

The term "pseudo version code" is also utilized without limitation, as the PVC 110, 114 may be implemented by any codes, indicators, counters, or other construct to distinguishably track changes to the respective VPD 109, 113. More particularly, each PVC is updated whenever the corresponding VPD is updated, and serves to represent the level of change experienced by that VPD. In one example, each PVC is updated by incrementing the PVC each time the associated VPD changes. Accordingly, each PVC comprises an alphabetic, numeric, alphanumeric, or other code with sufficient information to represent successive levels of change experienced by the associated VPD, and providing sufficient information that upon comparison of both PVCs the newer PVC can be identified. Optionally, each PVC may be a subcomponent of the associated VPD, such as an item of data therein.

Optionally, each controller may maintain multiple PVCs, one for different prescribed areas, topics, address ranges, or other components of the associated VPD. For example, there may be one PVC for the calibration related data in the VPD 109, and a separate PVC for configuration data in the VPD 109. In addition to the foregoing components, the library 100 may include a variety of other equipment familiar to those artisans of ordinary skill in the relevant art.

Exemplary Digital Data Processing Apparatus

As mentioned above, the accessor controllers 108,112 may be implemented in various forms. As one example, each controller (or both controllers, together) may comprise a digital data processing apparatus, as exemplified by the hardware components and interconnections of the digital data processing apparatus 200 of FIG. 2.

The apparatus 200 includes a processor 202, such as a microprocessor, personal computer, workstation, or other processing machine, coupled to a storage 204. In the present example, the storage 204 includes a fast-access storage 206, as well as nonvolatile storage 208. The fast-access storage 206 is used to store the programming instructions executed by the processor 202, and may be embodied by random access memory (RAM), or one or more other types of memory or a combination of the foregoing. The nonvolatile storage 208 may comprise, for example, battery backup RAM, flash PROM, EEPROM, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement the controllers 108, 112. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), and the like.

Operation

Having described the structural features of the present invention, the operational aspect of the present invention will now be described. Generally, this involves a method for maintaining consistent dual copies of vital product data in a dual accessor automated data storage library.

Signal-Bearing Media

Figure 2:
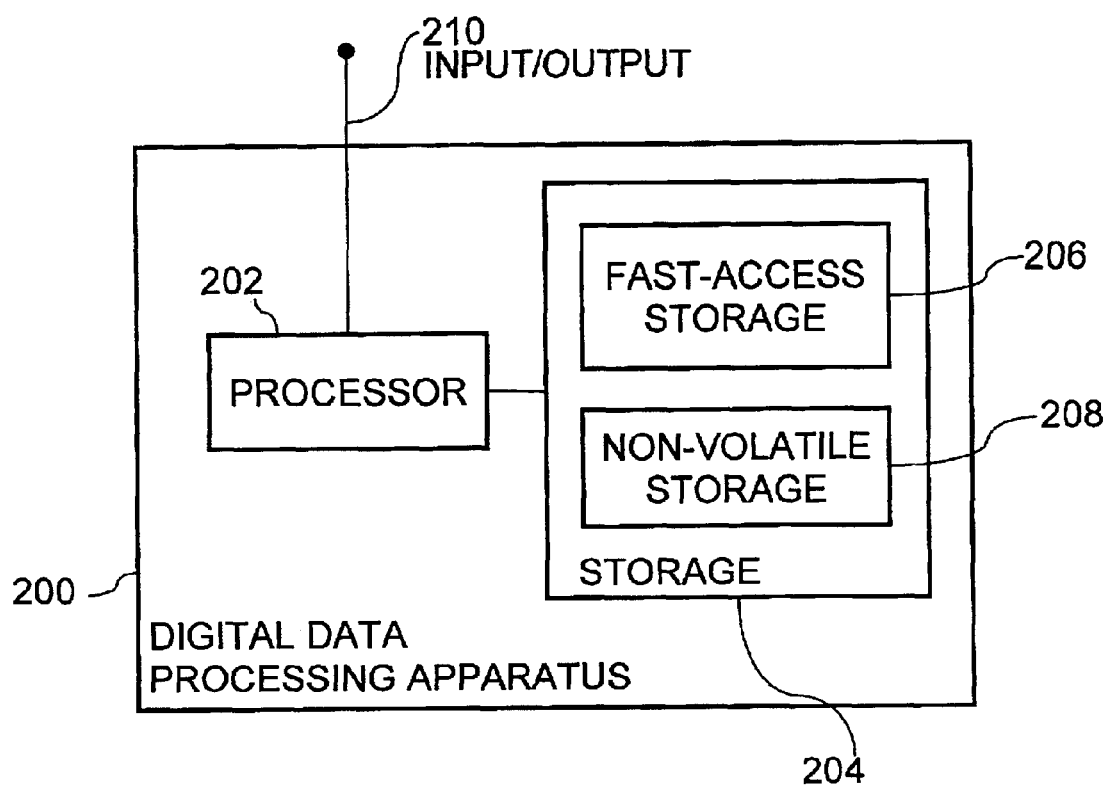
FIG. 2 is a block diagram of a digital data processing machine.
Figure 3:
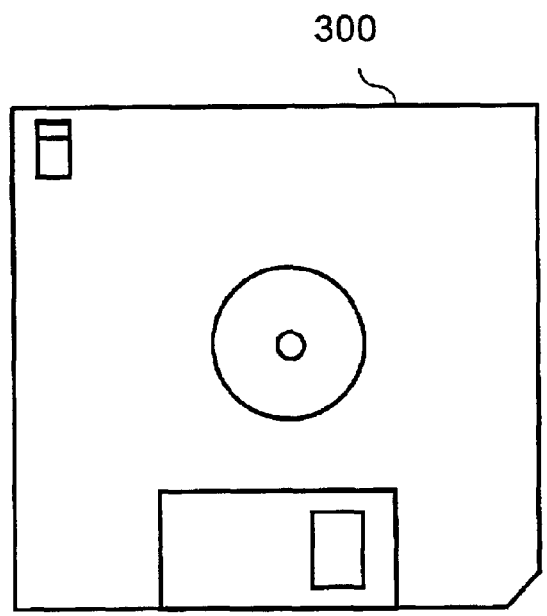
FIG. 3 shows an exemplary signal-bearing medium.

In embodiments where the controllers 108, 112 comprise one or more machine-executed program sequences, they may be implemented in various forms of signal-bearing media. In the context of FIG. 2, each such signal-bearing media may comprise, for example, the storage 204 or another signal-bearing media, such as a magnetic data storage diskette 300 (FIG. 3), directly or indirectly accessible by a processor 202. Whether contained in the storage 204, diskette 300, or elsewhere, the instructions may be stored on a variety of machine-readable data storage media. Some examples include direct access storage (e.g., a conventional "hard drive", redundant array of inexpensive disks (RAID), or another direct access storage device (DASD)), serial-access storage such as magnetic or optical tape, electronic non-volatile memory (e.g., ROM, EPROM, EEPROM, or flash PROM), battery backup RAM, optical storage (e.g., CD-ROM, WORM, DVD, digital optical tape), paper "punch" cards, or other suitable signal-bearing media including analog or digital transmission media and communication links and wireless communications. In an illustrative embodiment of the invention, the machine-readable instructions may comprise software object code, compiled from a language such as assembly language, C, etc.

Logic Circuitry

In contrast to the signal-bearing medium discussed above, the method aspect of the invention may be implemented using logic circuitry, without using a processor to execute instructions. In this embodiment, the logic circuitry is implemented in the controllers 108, 112, and is configured to perform operations to implement the method of the invention. The logic circuitry may be implemented using many different types of circuitry, as discussed above.

Operating Sequence

Figure 4:
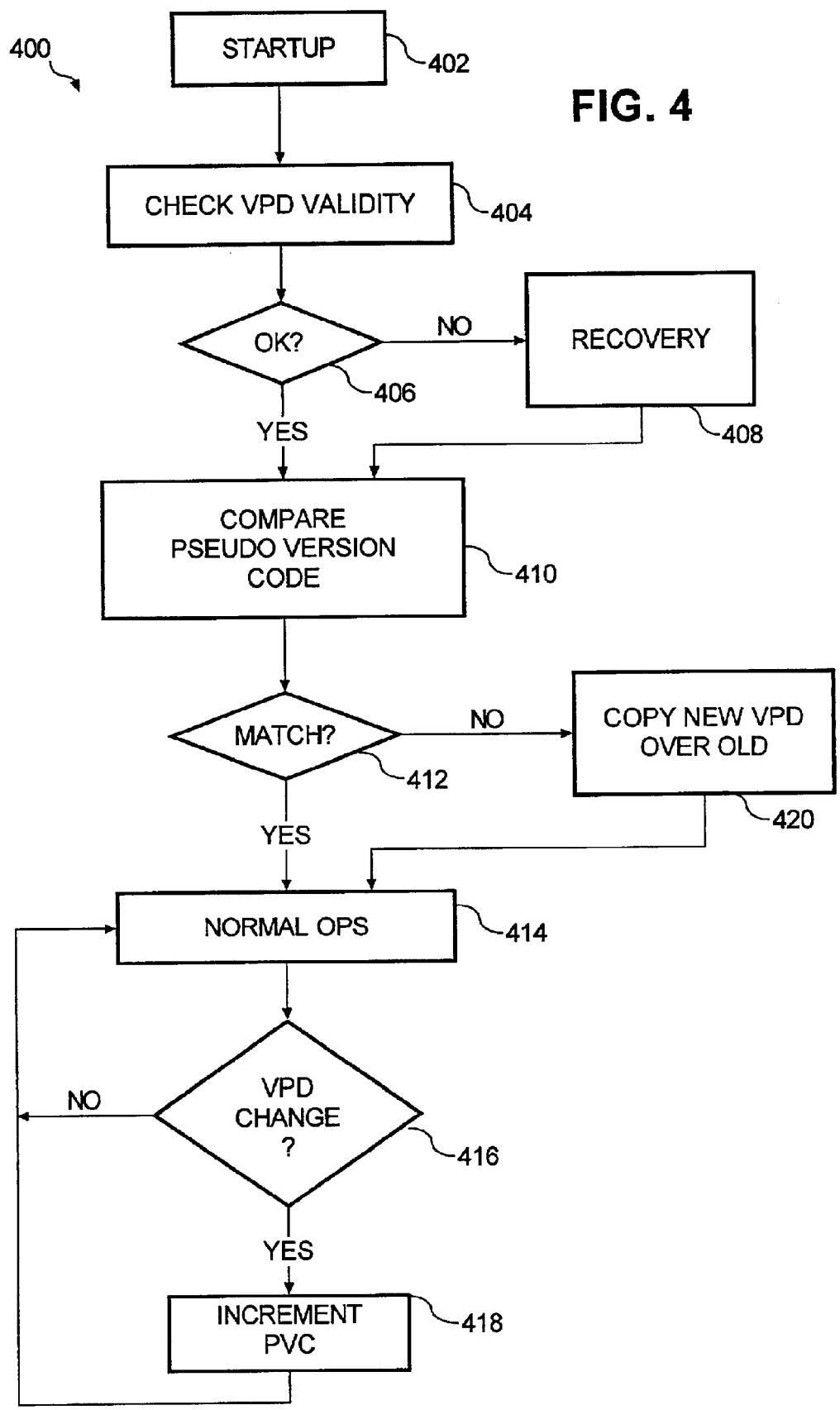
FIG. 4 is a flowchart of a sequence for maintaining VPD consistency in a dual accessor automated data storage library.

FIG. 4 shows an exemplary sequence 400 to maintain consistent dual VPD copies in a dual accessor automated data storage library. For ease of explanation, but without any intended limitation, the example of FIG. 4 is described in the context of the library 100 described above. For instance, the following discussion utilizes the example of a single PVC associated with each VPD, for ease of discussion. If multiple PVCs are used in conjunction with each VPD, operations of the sequence 400 are separately repeated as needed for each different component of the VPD having its own PVC.

Each controller 108, 112 performs the sequence 400 "semi-independently" of the other controller. This means that each controller performs some operations that do not involve the other controller, and other operations that require interaction with the other controller. In the present discussion, the sequence 400 is illustrated as being performed by the controller 108. As for the controller 112, a similar line of discussion applies, although such discussion has been omitted for the sake brevity.

The sequence 400 is initiated in step 402 when the controller 108 is started, powered on, reconfigured, rebooted, or another similar event or a combination of the foregoing. For ease of reference, the foregoing are referred to as "startup" events. Step 402 may also be initiated for the accessor 108 in response to the other controller 112 experiencing a startup event. Step 402 may be initiated by programming of the controller 108 itself, for example, by detecting the startup event or the other controller's startup event. Alternatively, step 402 may be initiated manually by a system administrator, operator, host computer, or other entity causing an appropriate hardware and/or software event at the controller 108.

Responsive to step 402, the controller 108 checks that the VPD 109 is valid (step 404). The controller 108 is not ready for service until its VPD 109 has been validated. For instance, this may be conducted as shown in copending U.S. patent application Ser. No. 09/847415, filed on May 3, 2001 in the names of Goodman et al. and entitled VERIFYING PRIMARY AND BACKUP COPIES OF VITAL INFORMATION FOR A PROCESSING SYSTEM EMPLOYING A PSEUDO-FIXED REFERENCE IDENTIFIER. The entirety of the foregoing application is hereby incorporated into the present disclosure by reference. By checking that the VPD 109 is valid, the controller 108 helps prevent operational errors within the library or its attached host system. For example, this check prevents errors otherwise arising when a component containing the VPD was swapped with the same component from another library.

Next, in step 406 the controller 108 advances to step 408 if the VPD 109 is invalid, in which case the controller 108 takes various actions to recover from the invalid VPD 109, also as taught by the above-captioned Goodman et al. application. Optionally, steps 404, 406, 408 may be omitted if desired.

Step 410 is performed when step 406 finds that the VPD 109 is valid, or after step 408 if the VPD was invalid, or after step 402 if steps 404, 406, 408 were omitted. In step 410, the controller 108 cooperates with the other controller 112 in comparing its PVC 110 with the other controller's PVC 114. Step 410 may be performed in a number of different ways. For instance, the controller 108 may obtain the PVC 114 from the other controller 112, then perform the comparison. In this case, the controller 108 may optionally broadcast its PVC 110 for the general use of the other controller 112 or for specific use by the other controller 112 in performing its own PVC comparison. Alternatively, the controller 108 may supply its PVC 110 to the other controller 112, which exclusively performs any comparison; in this case, the controller 108 receives the results of this comparison from the other controller 112. The sequence 400 may be implemented such that the controllers 108, 112 share PVCs during step 410 (as discussed above) or at any other advantageous time prior to step 410.

In addition to the foregoing instance (namely, after verifying VPD validity after a startup event), step 410 may additionally be performed for other reasons. For example, step 410 may be performed according to a prescribed schedule, on a timed interval, according to operator or host or other external input, etc.

After step 410, the controller 108 asks whether the PVCs match (step 412). Whether the PVCs match may be determined by the controller 108's own analysis, or by the controller 112's analysis relayed back to the controller 108, depending upon the manner of implementing step 410 as discussed above. If the PVCs do not match, the controller 108 cooperates with the other controller 112 in updating the older VPD with contents of the newer VPD (step 420). The "older" VPD is that VPD whose PVC is less advanced according to the VPD's sequence of progression, e.g., lower numerical value in the case of numeric PVCs, lower alphabetic value in the case of alphabetic PVCs, etc. In order to update the older VPD with contents of the newer VPD, the older VPD may be replaced, overwritten, deleted, canceled, inactivated, or otherwise substituted by the newer VPD. For example, if the VPD 113 is newer than the VPD 109, the controller 108 may request the VPD 113 from the other controller 112 (or receive the VPD 113 without request); upon receipt, the controller 108 utilizes the received VPD 113 to update the VPD 109. In any case, updating an older VPD with the newer VPD also includes the step of changing the old PVC to match the new PVC. In the embodiment where the PVC comprises an item of data in the associated VPD, and the act of updating older VPD with newer is performed by overwriting, then this inherently updates the PVC as it too is overwritten.

After step 420 (or step 412 finds that the PVCs match), step 414 is performed. In step 414, the controller 108 carries out host requests to move media items in the library infrastructure 102 and other normal library operations. As part of step 414, the VPD 109 may undergo one or more changes, for example, if there is a change to the configuration of the library infrastructure 102 or another aspect of the library affecting the VPD 109. Other examples of events that might change the VPD include the controller 108 completing calibration or re-calibration, receiving user-instituted VPD changes, the controller 108 experiencing or detecting additions to an error log, or other events for which it is desirable to maintain records in the VPD.

As mentioned above, normal operations 414 may include activity that changes the VPD 109. In step 416, the controller 108 determines whether any VPD "changes" have occurred. A VPD change may be defined as any change to a field, byte, unit of related subject matter, address unit or range, or any other unit of the VPD. Alternatively, a change may occur whenever the controller 108 receives user entry or approval of VPD changes, whether singly or in a batch of many changes. The exact manner in which VPD changes are quantified may vary considerably, as long as the controllers 108, 112 utilize the same methodology, namely, an approach that reliably increments the respective PVCs in identical ways responsive to the same VPD change. Accordingly, step 416 may be triggered by a VPD change, user entry of one or a batch of VPD changes, or another event such as a predetermined schedule, timed interval, etc.

Whenever the VPD 109 changes, the controller 108 increments the associated PVC 110 (step 418). By this action, the controller 108 forces the controller 112 to synchronize its VPD 113 when the controller 112 performs step 410 and thereby detects the VPD 109 change. As an additional option, the controller 108 may notify the controller 112 of the VPD change (step 418). This notification may involve controller 108 sending all or part of its VPD 109 to controller 112. Or, only the changed portion may be sent. Alternatively, the controller 112 may request all or part of the VPD 109 upon a notification that the VPD 109 has changed. In any case, controller 112 may or may not be available at the time that the change to the VPD 109 is made. After step 418, the routine 400 returns to step 414. In contrast to the foregoing description, in the absence of any change to the VPD 109, step 416 returns to step 414 where the controller 108 continues to operate normally.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for operating an automated data storage library including dual media accessors to transport portable data storage media among sites in the library, where each accessor is associated with an accessor controller and a metadata concerning library properties of prescribed types, and the library additionally contains a version code corresponding to each metadata, the method comprising operations of:

operating both accessor controllers to perform the following management operations, in each case these operations being performed by a subject accessor controller in regard to an other accessor controller and an other version code corresponding to the metadata associated with the other accessor controller:
the subject accessor controller advancing the version code corresponding to the associated metadata in accordance with changes to said metadata;
responsive to predetermined input stimuli, performing operations comprising:
the subject accessor controller retrieving the version code corresponding to the associated metadata;
only if the retrieved version code does not match the other version code, performing operations comprising:
if the retrieved version code is more advanced than the other version code, sending the subject accessor's associated metadata to the other accessor controller;
if the other version code is more advanced than the retrieved version code, receiving the other accessor's associated metadata and utilizing said received metadata to update the subject accessor's associated metadata.

2. The method of claim 1, the operations responsive to the predetermined input stimuli further comprising at least one of the following:
receiving the other version code from the other accessor controller, and comparing the retrieved version code with the other version code;
sending the retrieved version code to the other accessor controller for comparison, and receiving results of the comparison from the other accessor controller.

3. A method of operating an automated data storage library that includes multiple accessors for transporting portable data storage media and, for each accessor, associated components including a controller to manage the media accessor, metadata containing information representing prescribed types of library properties, and a metadata version code, where each controller advances the associated version code in response to changes to said metadata, the method comprising operations of:
responsive to predetermined stimuli, the accessor controllers comparing their associated version codes and if the version codes do not match, updating one of the metadata having a less advanced version code with contents of the other metadata.

4. The method of claim 3,
the library including multiple version codes associated with different subparts of each metadata;
the operations further comprising each controller advancing each version code in accordance with changes occurring to the associated subpart of the corresponding metadata;
the comparing and updating operations being repeated for each version code.

5. The method of claim 3, the metadata of each accessor having multiple subparts each having a different corresponding version code, the method further comprising repeating the management operations on behalf of each metadata subpart and its corresponding version code.

6. The method of claim 3, each version code comprising a subpart of the associated metadata.

7. At least one signal-bearing medium tangibly embodying at least one program of machine-readable instructions executable by one or more digital processing apparatuses to perform operations to manage an automated data storage library including dual media accessors to transport portable data storage media among sites in the library, where each accessor is associated with an accessor controller and a metadata concerning library properties of prescribed types, and the library additionally contains a version code corresponding to each metadata, the operations comprising:
operating both accessor controllers to perform the following management operations, in each case these operations being performed by a subject accessor controller in regard to an other accessor controller and an other version code corresponding to the metadata associated with the other accessor controller:
the subject accessor controller advancing the version code corresponding to the associated metadata in accordance with changes to said metadata;
responsive to predetermined input stimuli, performing operations comprising:
the subject accessor controller retrieving the version code corresponding to the associated metadata;
only if the retrieved version code does not match the other version code, performing operations comprising:
if the retrieved version code is more advanced than the other version code, sending the subject accessor's associated metadata to the other accessor controller;
if the other version code is more advanced than the retrieved version code, receiving the other accessor's associated metadata and utilizing said received metadata to update the subject accessor's associated metadata.

8. The medium of claim 7, the operations responsive to the predetermined input stimuli further comprising at least one of the following:
receiving the other version code from the other accessor controller, and comparing the retrieved version code with the other version code;
sending the retrieved version code to the other accessor controller for comparison, and receiving results of the comparison from the other accessor controller.

9. At least one signal-bearing medium tangibly embodying at least one program of machine-readable instructions executable by one or more digital processing apparatuses to perform operations to manage an automated data storage library that includes multiple accessors for transporting portable data storage media and, for each accessor, associated components including a controller to manage the media accessor, metadata containing information representing prescribed types of library properties, and a metadata version code, where each controller advances the associated version code in response to changes to said metadata, the operations comprising:
responsive to predetermined stimuli, the accessor controllers comparing their associated version codes and if the version codes do not match, updating one of the metadata having a less advanced version code with contents of the other metadata.

10. The medium of claim 9,
the library including multiple version codes associated with different subparts of each metadata;
the operations further comprising each controller advancing each version code in accordance with changes occurring to the associated subpart of the corresponding metadata;
the comparing and updating operations being repeated for each version code.

11. The medium of claim 9, the metadata of each accessor having multiple subparts each having a different corresponding version code, the operations further comprising repeating the management operations on behalf of each metadata subpart and its corresponding version code.

12. The medium of claim 9, each version code comprising a subpart of the associated metadata.

13. At least one logic circuit of multiple interconnected electrically conductive elements configured to perform operations to manage an automated data storage library including dual media accessors to transport portable data storage media among sites in the library, where each accessor is associated with an accessor controller and a metadata concerning library properties of prescribed types, and the library additionally contains a version code corresponding to each metadata, the operations comprising:
operating both accessor controllers to perform the following management operations, in each case these operations being performed by a subject accessor controller in regard to an other accessor controller and an other version code corresponding to the metadata associated with the other accessor controller:
the subject accessor controller advancing the version code corresponding to the associated metadata in accordance with changes to said metadata;
responsive to predetermined input stimuli, performing operations comprising:
the subject accessor controller retrieving the version code corresponding to the associated metadata;
only if the retrieved version code does not match the other version code, performing operations comprising:
if the retrieved version code is more advanced than the other version code, sending the subject accessor's associated metadata to the other accessor controller;
if the other version code is more advanced than the retrieved version code, receiving the other accessor's associated metadata and utilizing said received metadata to update the subject accessor's associated metadata.

14. At least one logic circuit of multiple interconnected electrically conductive elements configured to perform operations to manage an automated data storage library that includes multiple accessors for transporting portable data storage media and, for each accessor, associated components including a controller to manage the media accessor, metadata containing information representing prescribed types of library properties, and a metadata version code, where each controller advances the associated version code in response to changes to said metadata, the operations comprising:

responsive to predetermined stimuli, the accessor controllers comparing their associated version codes and if the version codes do not match, updating one of the metadata having a less advanced version code with contents of the other metadata.

15. An automated data storage library, comprising:

library infrastructure including one or more storage slots and one or more media access drives;

dual media accessors to transport removable media about the library infrastructure;

for each accessor, associated components including a controller, metadata containing information representing prescribed types of library properties, and a metadata version code;

the controllers configured to perform operations comprising:
advancing their associated version codes in response to changes to their associated metadata;
responsive to predetermined stimuli, comparing their associated version codes and if the version codes do not match, updating one of the metadata having a less advanced version code with contents of the other metadata.

16. An automated data storage library, comprising:

dual media accessors to transport portable data storage media among sites in the library;

associated with each accessor, a metadata concerning library properties of prescribed types;

a version code corresponding to each metadata;

associated with each accessor, an accessor controller configured to perform management operations, in each case these operations being performed by a subject accessor controller in regard to an other accessor controller and an other version code corresponding to the metadata associated with the other accessor controller, the management operations comprising:
the subject accessor controller advancing the version code corresponding to the associated metadata in accordance with changes to said metadata;
responsive to predetermined input stimuli, performing operations comprising:
the subject accessor controller retrieving the version code corresponding to the associated metadata;
only if the retrieved version code does not match the other version code, performing operations comprising:
if the retrieved version code is more advanced than the other version code, sending the subject accessor's associated metadata to the other accessor controller;
if the other version code is more advanced than the retrieved version code, receiving the other accessor's associated metadata and utilizing said received metadata to update the subject accessor's associated metadata.

17. An automated data storage library, comprising:

library infrastructure including one or more storage slots and one or more data storage drives;

dual media accessor means for transporting removable media about the library infrastructure;

for each accessor means, associated components including metadata containing information representing prescribed types of library properties, and a metadata version code;

controller means for managing the accessors by:
advancing their associated version codes in response to changes to their associated metadata;
responsive to predetermined stimuli, comparing their associated version codes and if the version codes do not match, updating one of the metadata having a less advanced version code with contents of the other metadata.

18. An automated data storage library, comprising:

dual media accessor means for transporting portable data storage media among sites in the library;

associated with each accessor, a metadata concerning library properties of prescribed types;

a version code corresponding to each metadata;

associated with each accessor, an accessor controller means for performing management operations, in each case these operations being performed by a subject accessor controller means in regard to an other accessor controller means and an other version code corresponding to the metadata associated with the other accessor controller means, the management operations comprising:
the subject accessor controller means advancing the version code corresponding to the associated metadata in accordance with changes to said metadata;
responsive to predetermined input stimuli, performing operations comprising:
the subject accessor controller means retrieving the version code corresponding to the associated metadata;
only if the retrieved version code does not match the other version code, performing operations comprising:
if the retrieved version code is more advanced than the other version code, sending the subject accessor means' associated metadata to the other accessor controller;
if the other version code is more advanced than the retrieved version code, receiving the other accessor means' associated metadata and utilizing said received metadata to update the subject accessor means' associated metadata.

* * * * *